United States Patent
Guo et al.

(10) Patent No.: US 11,983,916 B2
(45) Date of Patent: May 14, 2024

(54) RELOCATION METHOD, MOBILE MACHINE USING THE SAME, AND COMPUTER READABLE STORAGE MEDIUM

(71) Applicant: UBTECH ROBOTICS CORP LTD, Shenzhen (CN)

(72) Inventors: Rui Guo, Shenzhen (CN); Zhichao Liu, Shenzhen (CN); Zhanjia Bi, Shenzhen (CN); Yongsheng Zhao, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 387 days.

(21) Appl. No.: 17/463,523

(22) Filed: Aug. 31, 2021

(65) Prior Publication Data

US 2022/0147754 A1 May 12, 2022

Related U.S. Application Data

(63) Continuation of application No. PCT/CN2020/140578, filed on Dec. 29, 2020.

(30) Foreign Application Priority Data

Nov. 11, 2020 (CN) .......................... 20211267420.X

(51) Int. Cl.
*G06V 10/75* (2022.01)
(52) U.S. Cl.
CPC .......... *G06V 10/751* (2022.01); *G06V 10/759* (2022.01)
(58) Field of Classification Search
CPC ..... G06V 10/751; G06V 10/759; G06V 10/44
See application file for complete search history.

(56) References Cited

U.S. PATENT DOCUMENTS

| 9,238,304 B1 * | 1/2016 | Bradski | B65G 47/50 |
| 10,474,934 B1 * | 11/2019 | Cosic | G06V 30/194 |

(Continued)

FOREIGN PATENT DOCUMENTS

| CN | 110207710 A | 9/2019 | |
| WO | WO-2022265940 A1 * | 12/2022 | ............ B25J 13/087 |
| WO | WO-2023187006 A1 * | 10/2023 | ............ B25J 9/1633 |

OTHER PUBLICATIONS

D. A. Simon, L. E. Weiss and A. C. Sanderson, "Self-tuning of robot program primitives," Proceedings., IEEE International Conference on Robotics and Automation, Cincinnati, OH, USA, 1990, pp. 708-713 vol. 1, doi: 10.1109/ROBOT.1990.126068. (Year: 1990).*

(Continued)

*Primary Examiner* — Mia M Thomas

(57) ABSTRACT

A relocation method and a mobile machine using the same are provided. The method includes: obtaining a global map and a current scan map of a target scene where a mobile machine is located, and generating a local sub-map based on the global map; obtaining a black boundary in the local sub-map, determining a length and a curve complexity of the black boundary, and determining a weight of the black boundary based on the length and the curve complexity of the black boundary; determining an estimated pose and a target black boundary based on the local sub-map and the current scan image, and obtaining a matching value between the current scan image and the local sub-map based on a weight of the target black boundary; and determining the estimated pose as a relocated pose of the mobile machine in response to the matching value being larger than a preset threshold.

20 Claims, 8 Drawing Sheets

(56) References Cited

U.S. PATENT DOCUMENTS

| | | | |
|---|---|---|---|
| 10,740,911 B2* | 8/2020 | Phan | G06V 20/10 |
| 10,839,556 B2* | 11/2020 | Sinha | G06T 7/75 |
| 11,010,630 B2* | 5/2021 | Yang | G06T 7/246 |
| 11,210,554 B2* | 12/2021 | Dutta | G06V 10/82 |
| 11,348,269 B1* | 5/2022 | Ebrahimi Afrouzi | G06T 7/33 |
| 11,673,581 B2* | 6/2023 | Wang | G06F 18/2415 |
| | | | 701/23 |
| 11,908,548 B2* | 2/2024 | Dutta | G06V 10/993 |
| 2013/0138247 A1* | 5/2013 | Gutmann | G01S 17/06 |
| | | | 901/1 |
| 2017/0228940 A1* | 8/2017 | Kutliroff | G06V 20/00 |
| 2018/0189577 A1* | 7/2018 | Yoo | G06T 7/593 |
| 2020/0005486 A1* | 1/2020 | Sinha | G06T 7/337 |
| 2020/0089236 A1* | 3/2020 | Doemling | G05D 1/0212 |
| 2020/0302621 A1* | 9/2020 | Kong | G06T 7/75 |
| 2021/0179356 A1* | 6/2021 | Chen | G06T 7/70 |
| 2022/0016779 A1* | 1/2022 | Wang | G06T 7/50 |
| 2022/0402139 A1* | 12/2022 | Pidaparthi | B25J 9/163 |
| 2022/0409468 A1* | 12/2022 | Zhang | G05D 1/0231 |
| 2022/0409469 A1* | 12/2022 | Shen | A63B 21/0058 |
| 2023/0012372 A1* | 1/2023 | Saha | G06N 3/09 |
| 2024/0054704 A1* | 2/2024 | Polichroniadis | G06T 11/60 |

OTHER PUBLICATIONS

ISR for PCT/CN2020/140578.
Written opinions of ISA for PCT/CN2020/140578.

* cited by examiner

RELOCATION METHOD, MOBILE MACHINE USING THE SAME, AND COMPUTER READABLE STORAGE MEDIUM

CROSS REFERENCE TO RELATED APPLICATIONS

The present disclosure is a continuation-application of International Application PCT/CN2020/140578, with an international filing date of Dec. 29, 2020, which claims foreign priority of Chinese Patent Application No. 202011257420.X, filed on Nov. 11, 2020 in the State Intellectual Property Office of China, the contents of all of which are hereby incorporated by reference.

BACKGROUND

1. Technical Field

The present disclosure relates to mobile machine technology, and particularly to a relocation method, a mobile machine using the same, and a computer readable storage medium.

2. Description of Related Art

During the use of a robot, the robot needs to be relocated because of various reasons (e.g., abnormal power cut) that cause the localization failure of the robot. In the existing robot relocation method, the relocation of a robot is mainly performed by template matching or gradient matching that both focus on the influence of large areas or long boundaries on matching. However, because the maps constructed by the robot are usually 2D grid maps which can only describe the boundary information such as objects and walls that is at the same height. Therefore, for the long corridor area or the junction with multiple walls, the boundary information described in the 2D grid maps have high similarity, which makes the distinction between the large areas and the long borders often not obvious, which results in the high false alarm rate of successful relocation of the robot and affects the user experience.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be noted that, the drawings in the following description merely show some embodiments. For those skilled in the art, other drawings may be obtained according to the drawings without creative efforts.

DETAILED DESCRIPTION

Figure 1:
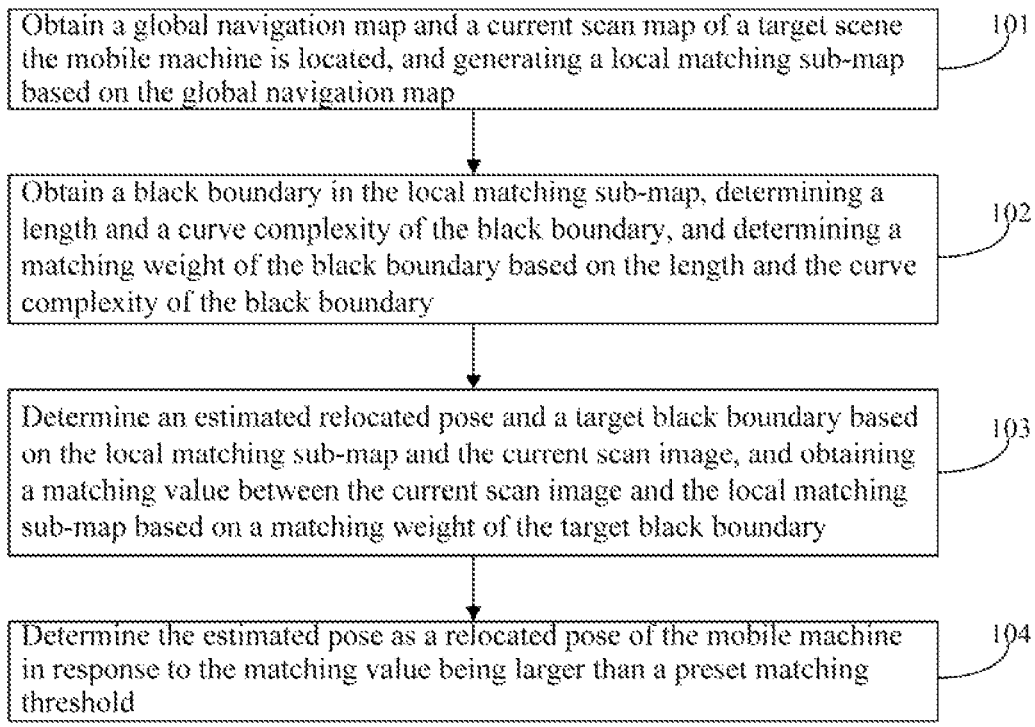
FIG. 1 is a flow chart of a relocation method according to an embodiment of the present disclosure.

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that the term "and/or" used in the description and the appended claims of the present disclosure refers to any combination of one or more of the associated listed items and all possible combinations, and includes such combinations.

As used in the description and the appended claims of the present disclosure, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the description and the appended claims of the present disclosure, the terms "first", "second", "third", and the like in the descriptions are only used for distinguishing, and cannot be understood as indicating or implying relative importance.

In the present disclosure, the descriptions of "one embodiment", "some embodiments" or the like described in the specification mean that one or more embodiments of the present disclosure can include particular features, structures, or characteristics which are related to the descriptions of the descripted embodiments. Therefore, the sentences "in one embodiment", "in some embodiments", "in some other embodiments", "in other embodiments" and the like that appear in different places of the specification do not mean that descripted embodiments should be referred by all other embodiments, but instead be referred by "one or more but not all other embodiments" unless otherwise specifically emphasized. The terms "including", "comprising", "having" and their variations all mean "including but not limited to" unless otherwise specifically emphasized.

During the use of a mobile machine, the mobile machine needs to be relocated because of various reasons (e.g., abnormal power cut) that cause the localization failure of the mobile machine. In the existing mobile machine relocation method, the relocation of a mobile machine is mainly performed by template matching or gradient matching that both focus on the influence of large areas or long boundaries on matching. However, because the maps constructed by the mobile machine are usually 2D grid maps which can only describe the boundary information such as objects and walls that is at the same height. Therefore, for the long corridor area or the junction with multiple walls, the boundary information described in the 2D grid maps have high similarity, which makes the distinction between the large areas and the long borders often not obvious, which results in the high false alarm rate of successful relocation of the mobile machine and affects the user experience.

In which, the false alarm of successful relocation means that the relocated pose of the mobile machine in the grid map is not the true mapping of the current position and orientation of the mobile machine in the map. In other words, the false alarm of successful relocation means that the mobile machine determines an incorrect pose as the relocated pose of the mobile machine.

In order to solve the above-mentioned technical problems, in the prior art, it often introduces rich and complex visual features by using camera(s), so as to use the matching of the rich and complex visual features to reduce the false alarm of successful relocation of the mobile machine and improve the robustness of the relocation. Although the problem of the high false alarm rate of successful relocation of the mobile machine can be solved to a certain extent by using camera(s), it will extremely add the hardware costs and is difficult to be widely used in actual scenes.

In order to solve the above-mentioned technical problems, the embodiments of the present disclosure provide a relocation method. In the method, when the mobile machine needs to relocate, the matching weight of the black boundaries may be set according to the length and curve complexity of the black boundaries to increase the effect of small objects and thin areas to the matching in the relocation, thereby effectively solving the problem of the high false alarm rate of successful relocation without increasing hardware costs, improving the robustness of relocation, and improving the user experience.

FIG. 1 is a flow chart of a relocation method according to an embodiment of the present disclosure. In this embodiment, the relocation method is a computer-implemented method executable for a processor, which may be applied to a mobile machine with positioning function, for example, a robot, a vehicle, a mobile phone, a tablet, a wearable device, or the like so as to realize its relocation. Although the type of mobile machine is not limited, a robot is used as the example of the mobile machine for description. The method may be implemented through a relocation apparatus shown in FIG. 7 or a mobile machine shown in FIG. 8. As shown in FIG. 1, the method may include the following steps.

S101: obtaining a global navigation map and a current scan map of a target scene the mobile machine is located, and generating a local matching sub-map based on the global navigation map.

In which, the target scene refers to a scene corresponding to the current location of the robot. The global navigation map refers to a 2D grid map obtained by constructing a map of an environment containing the target scene through simultaneous localization and mapping (SLAM) technology. Each pixel in the global navigation map may correspond to, for example, a 5 cm*5 cm square area in the actual scene. The current scan image refers to an image that the robot generates by collecting a single or a plurality of frames of laser scan data at its current location and generating based on the laser scan data. Similarly, each pixel in the current scan image may correspond to, for example, a 5 cm*5 cm square area in the actual scene.

In the global navigation map and the current scan map, the black areas represent the boundaries of an object or a wall scanned by laser, the white areas represent the areas where the robot can pass, and the gray areas represent the areas unknown to the robot. The length and curve complexity of a black boundary determine to a certain extent the degree of difficulty of the corresponding object or wall to be moved or changed. In which, the longer the black boundary, the smaller the curve complexity, it usually represents the large object or wall that cannot be easily moved or changed in the actual scene; on the contrary, it represents small objects such as sofas, tables and chairs that can be easily moved or changed.

In one embodiment, before generating the local matching sub-map based on the global navigation map, the global navigation map may be processed in advance to generate an optimized navigation map with single-pixel-wide black boundaries and without independent black pixel area to avoid the extra black pixels affecting the determination of the matching weight of the black boundaries and avoid the influence of the noise of laser on the relocation of the robot. At the same time, adaptive matching areas may be determined. Then, a local matching sub-map may be generated based on the adaptive matching areas and the optimized navigation map. As an example, a local area in the optimized navigation map that corresponds to the adaptive matching area may be determined as a local matching sub-map.

Figure 2:
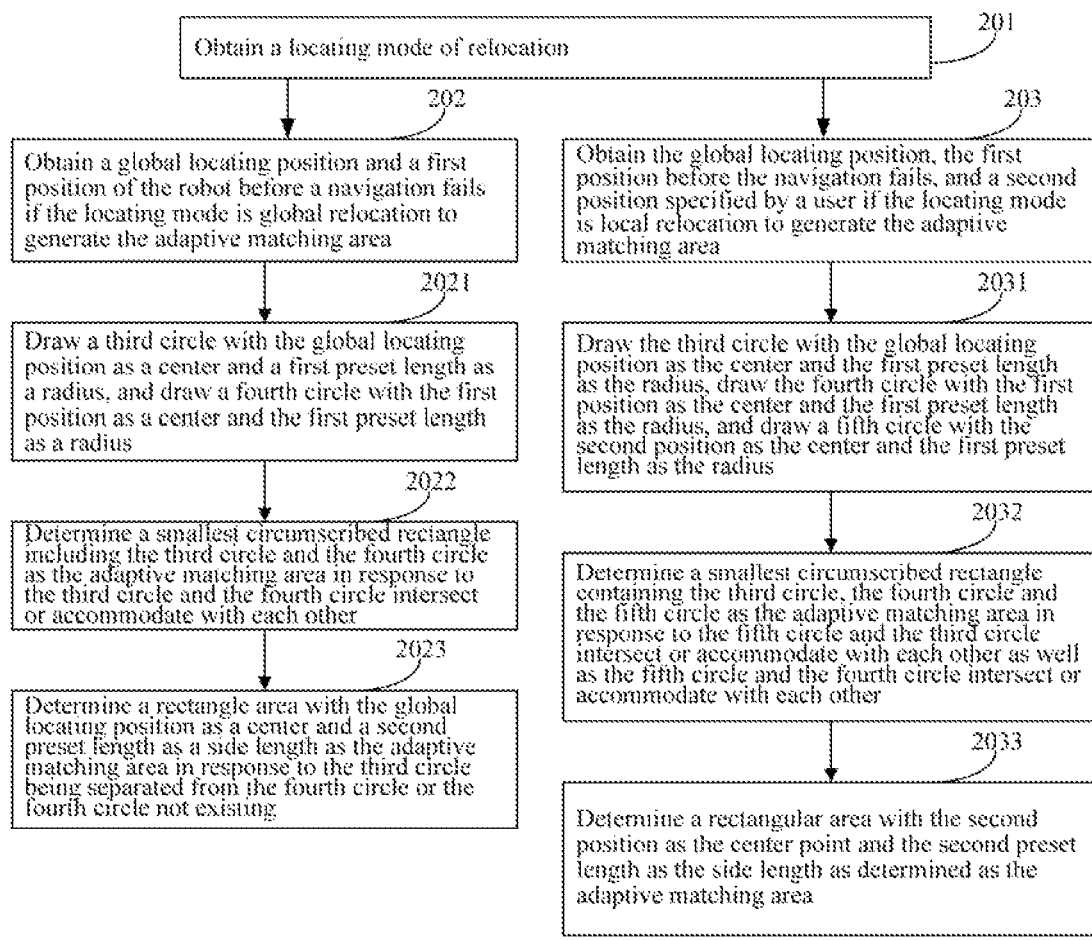
FIG. 2 is a flow chart of determining an adaptive matching area according to an embodiment of the present disclosure.

In which, the preprocessing of the global navigation map will be described in detail below. The following first introduces the process of determining the adaptive matching area. FIG. 2 is a flow chart of determining an adaptive matching area according to an embodiment of the present disclosure. As shown in FIG. 2, the determining the adaptive matching area may include the following steps.

S201: obtaining a locating mode of relocation.

The locating mode of relocation may include a global relocation and a local relocation. In this embodiment, the locating mode of the above-mentioned relocation may be determined according to whether the user specifies a location during the above-mentioned relocation or not. For example, in the case that the user has specified a location and the specified location is a valid location, it can be determined that the locating mode is the local relocation; and in the case that the user does not specify a location, or the specified location is an invalid location, it can be determined that the locating mode is the global relocation. The valid location refers to a location in the white area of the global navigation map, and the invalid location refers to a location in the black area or the gray area of the global navigation map. The user may specify a location by inputting a location in the global navigation map or clicking on a specific location in the global navigation map.

S202: obtaining a global locating position of the robot and a first position of the robot before a navigation fails in response to the locating mode being global relocation, and generating the adaptive matching area based on the global locating position and the first position.

In this embodiment, the global locating position may be determined based on a visual coarse relocation algorithm which may be implemented based on bag-of-words (BoW) model. As an example, during a map construction using laser SLAM technology, each time when a laser key frame is generated, a frame of image of the current moment may be collected at the same time to process using the BoW model, and the pose corresponding to the laser key frame is saved in association with the frame of image. During the relocation, the image of the current location of the robot may be collected (through, for example, a camera disposed on the robot), and then similarity retrieval may be performed on the image using the BoW model. If the target image corresponding to the above-mentioned image is retrieved, the displacement information in the pose corresponding to the target image may be determined as the global locating position, otherwise it can be considered that there is no global locating position. In which, the target image is any frame of the images that are synchronously collected during the map construction.

In one embodiment, the generating the adaptive matching area based on the global locating position and the first position may include:

S2021: drawing a third circle with the global locating position as a center and a first preset length as a radius, and drawing a fourth circle with the first position as a center and the first preset length as a radius;

S2022: determining a smallest circumscribed rectangle including the third circle and the fourth circle as the adaptive matching area in response to the third circle and the fourth circle intersect or accommodate with each other; and S2023, determining a rectangle area with the global locating position as a center and a second preset length as a side length as the adaptive matching area in response to the third circle being separated from the fourth circle or the fourth circle not existing.

Figure 3:
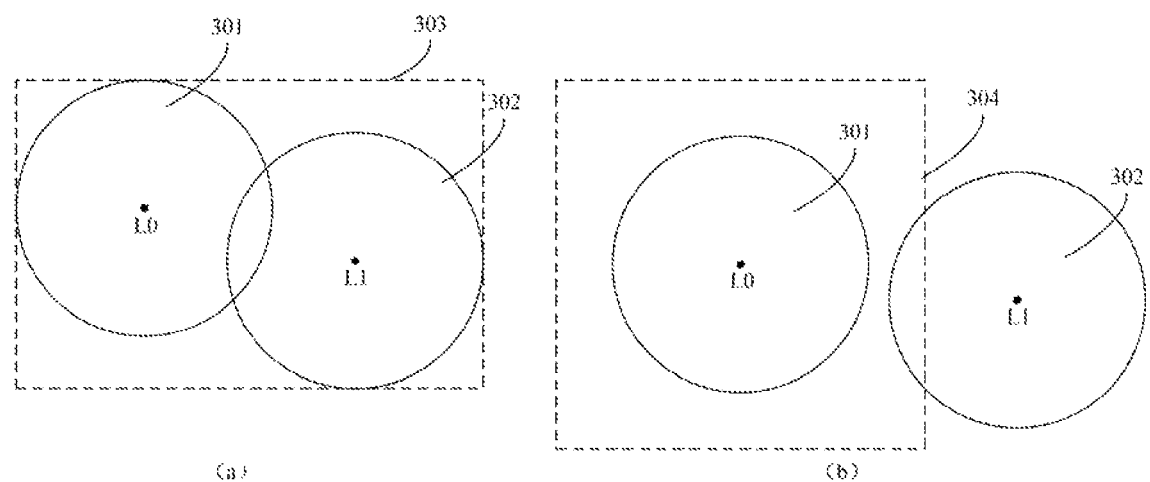
FIG. 3 is a schematic diagram of an example of determining adaptive matching areas according to an embodiment of the present disclosure.

For the above-mentioned S2021-S2023, in the case that the global locating position and the first position exist and are both valid positions, a circle may be drawn with the global locating position L0 and the first position L1 as the center, respectively, and the first preset length as the radius to obtain the third circle and the fourth circle, respectively. FIG. 3 is a schematic diagram of an example of determining adaptive matching areas according to an embodiment of the present disclosure. As shown in part (a) of FIG. 3, if the third circle 301 and the fourth circle 302 intersect or accommodate with each other, the areas covered by the two circles are merged, and the smallest circumscribed rectangle 303 covering the covered area is determined as an adaptive matching area. As shown in part (b) of FIG. 3, if the third circle 301 is separated from the fourth circle 302, the square area 304 with the global locating position L0 as the center point and the second preset length as the side length may be determined as an adaptive matching area. A description format of the adaptive matching area may include a starting coordinate at the upper left corner and a area length and area width corresponding to the adaptive matching area.

It should be noted that, in this embodiment, the accommodation means that the third circle overlaps the fourth circle, and the separation means that the third circle not overlaps the fourth circle. The first preset length and the second preset length may be determined according to the actual condition. For example, the first preset length may be determined as 100 pixels, that is, the corresponding actual distance may be 5m; and the second preset length may be determined as 140 pixels, that is, the corresponding actual distance may be 7 m.

In the case that the first position does not exist or is an invalid position, the square area with the global locating position as the center point and the second preset length as the side length may be determined as the adaptive matching area, that is, the square area in part (b) of FIG. 3 may be determined as the adaptive matching area. In the case that the global locating position does not exist or is an invalid position, it can directly return a relocation failure and exit the locating mode of the global relocation.

S203: obtaining the global locating position of the robot, the first position of the robot before the navigation fails, and a second position specified by a user in response to the locating mode being local relocation, and generating the adaptive matching area based on the global locating position, the first position, and the second position.

In one embodiment, the generating the adaptive matching area based on the global locating position, the first position, and the second position may include:

S2031: drawing the third circle with the global locating position as the center and the first preset length as the radius, drawing the fourth circle with the first position as the center and the first preset length as the radius, and drawing a fifth circle with the second position as the center and the first preset length as the radius;

S2032: determining a smallest circumscribed rectangle containing the third circle, the fourth circle and the fifth circle as the adaptive matching area in response to the fifth circle and the third circle intersect or accommodate with each other as well as the fifth circle and the fourth circle intersect or accommodate with each other; and S2033: determining a rectangular area with the second position as the center point and the second preset length as the side length as the adaptive matching area in response to the fifth circle being separated from the third circle or the fifth circle being separated from the fourth circle.

Figure 4:
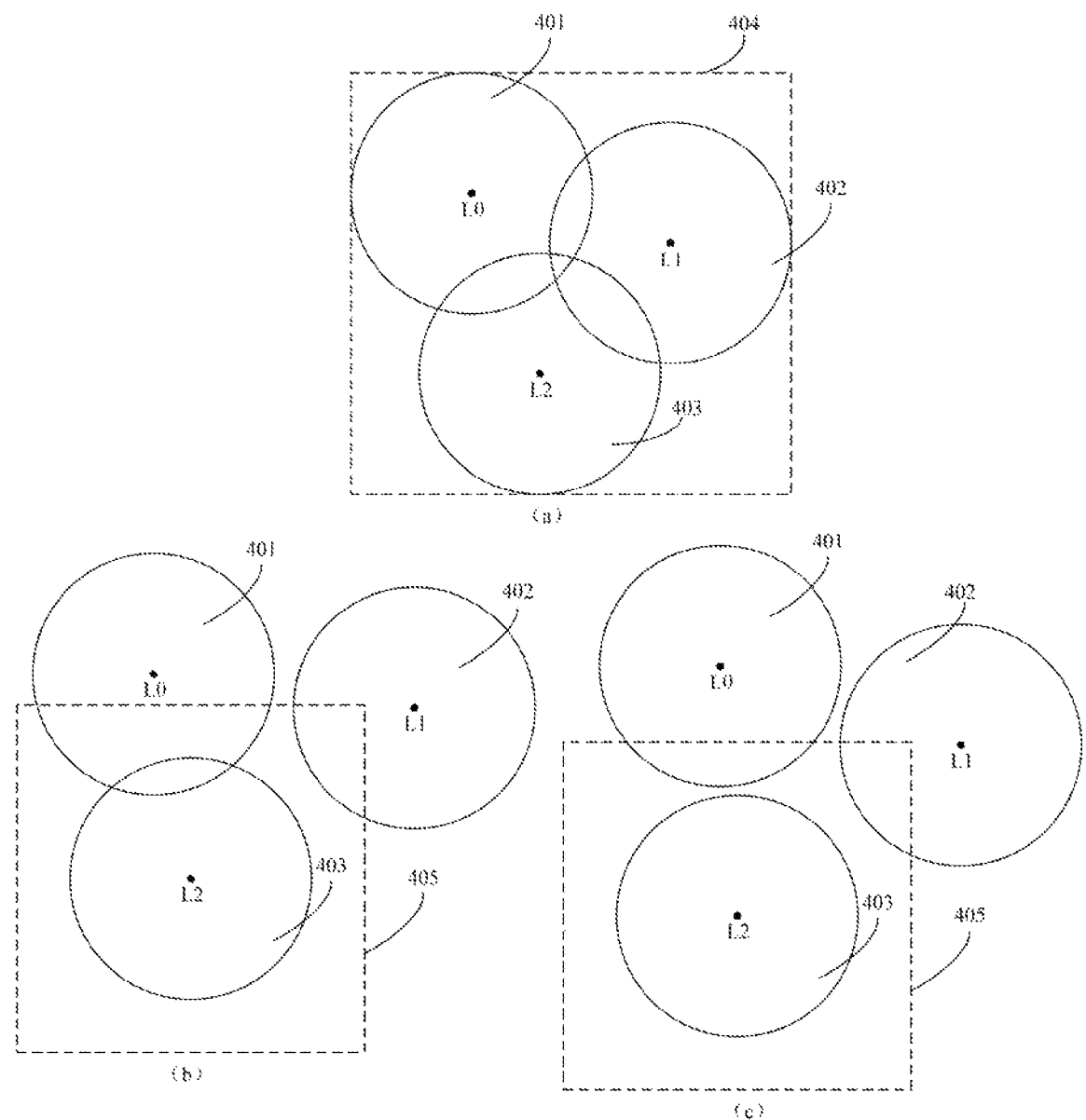
FIG. 4 is a schematic diagram of another example of determining adaptive matching areas according to an embodiment of the present disclosure.

For the above-mentioned S2031-S2033, in the local relocation, the second position L2 designated by the user is generally a valid position. At this time, in the case that the global locating position L0, and the first position L1 exist and are both valid positions, the third circle 401, the fourth circle 402 and the fifth circle 40 may be drawn using the global locating position L0, the first position L1, and the second position 12 as the center, respectively, and the first preset length as the radius. FIG. 4 is a schematic diagram of another example of determining adaptive matching areas according to an embodiment of the present disclosure. As shown in part (a) of FIG. 4, if the fifth circle 403 and the third circle 401 intersect or accommodate with each other, and the fifth circle 403 and the fourth circle 402 intersect or accommodate with each other, the area covered by the three circles are merged, and the smallest circumscribed rectangle 404 covering the covered area is determined as the adaptive matching area. As shown in part (b) and (c) of FIG. 4, if the fifth circle 403 is separated from the fourth circle 402, or the fifth circle 403 is separated from the third circle 401, the square area 40S with the second positions 12 as the center and the second preset length as the side length is determined as the adaptive matching area. Similarly, the first preset length may be 100 pixels, and the second preset length may be 140 pixels.

In the case that the global locating position does not exist or is an invalid position, or the first position does not exist or is an invalid position, the square area with the second position as the center point and the second preset length as the side length may be determined as the adaptive matching area.

S102: obtaining a black boundary in the local matching sub-map, determining a length and a curve complexity of the black boundary, and determining a matching weight of the black boundary based on the length and the curve complexity of the black boundary.

In this embodiment, after the local matching sub-map is generated, the black boundaries in the local matching sub-map may be obtained using a region growing algorithm of black pixel. The seed points in the region growing algorithm may be selected from the global navigation map in the order from left to right and top to bottom. In which, the selected seed points are the black pixels that are not currently divided into any black boundary.

As an example, the length of a black boundary may be measured by the amount of black pixels contained in the black boundary. That is, for any black boundary, the amount of black pixels contained in the black boundary may be obtained first, then the amount of black pixels may be determined as the length of the black boundary. For example, if the amount of black pixels included in a certain black boundary is 6, it may be determined that the length of the black boundary is 6 pixels.

Figure 5:
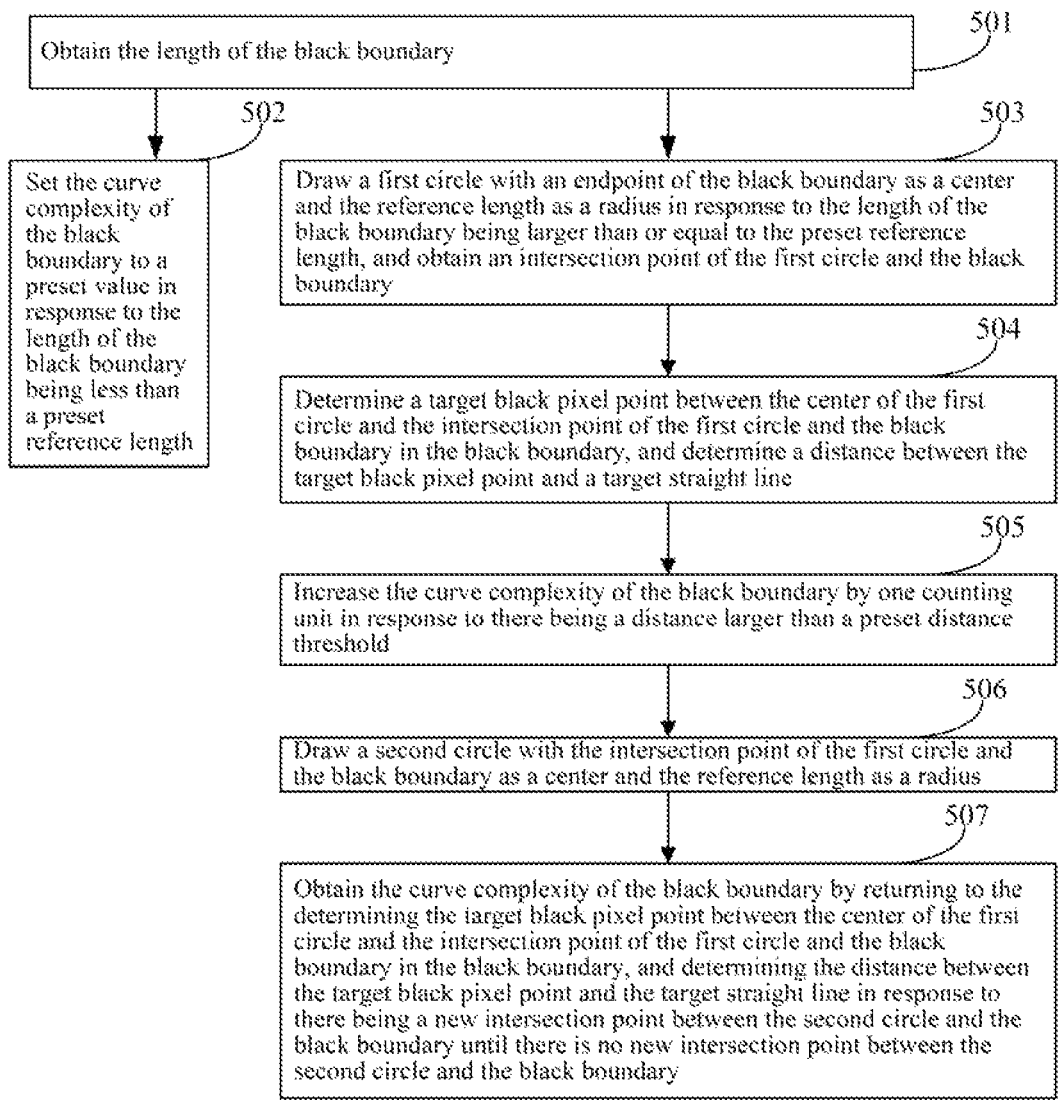
FIG. 5 is a flow chart of determining the curve complexity of a black boundary according to an embodiment of the present disclosure.

After determining the length of the black boundary, the curve complexity of the black boundary may be determined based on the length of the black boundary. FIG. 5 is a flow chart of determining the curve complexity of a black boundary according to an embodiment of the present disclosure. As shown in FIG. 5, the determining the curve complexity of the black boundary may include the following steps.

S501, obtaining the length of the black boundary.

S502: setting the curve complexity of the black boundary to a preset value in response to the length of the black boundary being less than a preset reference length.

In which, the curve complexity of the black boundary refers to the fractal dimension of the black boundary. The preset reference length and preset value may be set according to the actual condition. For example, the reference length r may be set to 10 pixels, and its preset value may be set to 0. That is, for each black boundary, if the length of the black boundary is less than 10 pixels, the curve complexity of the black boundary may be set to 0.

S503: drawing a first circle with an endpoint of the black boundary as a center and the reference length as a radius in response to the length of the black boundary being larger than or equal to the preset reference length, and obtaining an intersection point of the first circle and the black boundary.

S504: determining a target black pixel point between the center of the first circle and the intersection point in the black boundary, and determining a distance between the target black pixel point and a target straight line, where the target straight line is determined based on the center of the first circle and the intersection point.

S505: increasing the curve complexity of the black boundary by one counting unit in response to there being a distance larger than a preset distance threshold.

S506: drawing a second circle with the intersection point as a center and the reference length as a radius.

S507: obtaining the curve complexity of the black boundary by returning to the determining the target black pixel point between the center of the first circle and the intersection point in the black boundary, and determining the distance between the target black pixel point and the target straight line in response to there being a new intersection point between the second circle and the black boundary until there is no new intersection point between the second circle and the black boundary.

For the above-mentioned S503-S507, for each black boundary, in that case that the length of the black boundary is larger than or equal to the reference length r, that is, if the length of the black boundary is larger than or equal to 10 pixels, the first circle with the reference length as the radius may be drawn by using an end point of the black boundary as a starting point and the starting point as the center. The first circle may intersect the black boundary at another point, and the intersected point is the intersection point between the first circle and the black boundary. Then, a straight line including the starting point and the intersection point may be determined, the target black pixel points located between the starting point and the intersection point that are on the black boundary may be determined, and the distance between each target black pixel point and the straight line may be calculated. If the distance between at least one target pixel and the straight line is larger than the preset distance threshold, the curve complexity of the black boundary may be increased by one counting unit, for example, by one pixel; otherwise, the curve complexity of the black boundary remains unchanged. In which, the preset distance threshold may be set according to the actual condition. For example, the distance threshold may be set to 2 pixels, and for each black boundary, the initial value of the curve complexity of the black boundary may be 0, then the second circle with the reference length as the radius may be drawn by taking the above-mentioned intersection point as the starting point and taking the starting point as the center, and then whether there is a new intersection point between the second circle and the black boundary is determined. In this manner, the above-mentioned steps are performed until no new intersection point on the black boundary is generated. At this time, the obtained curve complexity is the curve complexity of the black boundary.

In which, the new intersection point refers to the intersection point other than that has had been taken as the starting point. In other words, the new intersection point is a point other than the center of the circle drawn above. For example, if there is an intersection point A and an intersection point B between the second circle drawn for the first time and the black boundary, and the intersection point A is the center of the first circle, at this time there is the new intersection point 13 between the second circle and the black boundary. For another example, if there are an intersection point C and an intersection point D between the second circle drawn for the second time and the black boundary, and the intersection point C is the center of the second circle drawn for the first time, at this time there is the new intersection point D between the second circle and the black boundary.

In one embodiment, the determining the matching weight of the black boundary based on the length and the curve complexity of the black boundary includes:

calculating the matching weight of the black boundary through an equation of:

$$W_i = e^{D_i(r)/\ln(L_i)};$$

where, $W_i$ is the matching weight of the i-th black boundary, $D_i(r)$ is the curve complexity of the i-th black boundary, $L_i$ is the length of the i-th black boundary, and r is the reference length.

From S501-S507, it can be seen that for a large object or wall, the length of its black boundary will be larger or its curve complexity will be smaller, while for a small object, the length of its black boundary will be smaller or its curve complexity will be larger. Therefore, when setting the matching weight of the black boundary using the above-mentioned equation, it may make the black boundaries of the large object or wall have a relatively small matching weight and make the black boundaries of the small object or thin area have a relatively large matching weight. By increasing the matching weigh of small objects or thin areas, the effect of small objects or thin areas on the matching in the relocation is increased, thereby reducing the false alarm rate of successful relocation without increasing the hardware cost, and improving the robustness of relocation.

In this embodiment, after the global navigation map is obtained, all the black boundaries in the global navigation map may be obtained through the region growing algorithm, and the matching weights of all the black boundaries may be determined using the above-mentioned determination method. Therefore, when the robot needs to relocate, the black boundaries in the local matching sub-map and their matching weights may be obtained directly based on the black boundaries in the global navigation map and their matching weights after determining the local matching sub-map, which may effectively reduce the process of determining the black boundary and its matching weight during relocation, thereby improving the efficiency of relocation.

It should be noted that, after the matching weight of each black boundary in the local matching sub-map is obtained, the matching weight may be normalized to facilitate the subsequent processing. In one embodiment, the ratio of the matching weight of each black boundary to the sum of the matching weights of all the black boundaries may be determined as the normalized matching weight of each black boundary. For example, if a local matching sub-map includes a black boundary A, a black boundary B, a black boundary C. and a black boundary D, and the matching weight of black boundary A is $W_A$, the matching weight of black boundary B is $W_B$, the matching weight of black boundary C is $W_C$, and the matching weight of the black boundary D is $W_D$, the normalized matching weight of the black boundary A may be $W_A/(W_A+W_B+W_C+W_D)$, the normalized matching weight of the black boundary B may be $W_B/(W_A+W_B+W_C+W_D)$, the normalized matching weight of the black boundary C may be $W_C/(W_A+W_B+W_C+W_D)$, and the normalized matching weight of the black boundary D may be $W_D/(W_A+W_D+W_C+W_D)$.

S103: determining an estimated pose and a target black boundary based on the local matching sub-map and the current scan image, and obtaining a matching value between the current scan image and the local matching sub-map based on a matching weight of the target black boundary, where the target black boundary is the black boundary of the matching local matching sub-map matching the current scan map.

In one embodiment, template matching or gradient matching may be used to obtain the target black boundary that matches between the local matching sub-map and the current scan image, and determine the estimated pose. In which, if a certain black boundary in the local matching sub-map has an independent black boundary in the current scan image that closely fits or overlaps with it, the black boundary in the local matching sub-map is the target black boundary. After determining all the target black boundaries in the local matching sub-map, the matching weights of the target black boundaries can be added to take as the matching value S0 between the current scan image and the local matching sub-map. In which, whether the black boundaries closely fit or overlap may be determined according to the similarity between the black boundaries, and the determining of the similarity may use any existing method, which is not limited herein.

It should be noted that, the existing method for determining the pose using template matching or gradient matching may be used, which is not limited herein.

S104: determining the estimated pose as a relocated pose of the mobile machine in response to the matching value being larger than a preset matching threshold.

In which, the preset matching threshold may be set according to the actual condition. For example, the preset matching threshold may be set to any value between 0.85 and 0.95. Therefore, if the matching value S0 between the current scan image and the local matching sub-map is larger than the matching threshold, it indicates that the relocation is successful, and the estimated pose is determined as the relocated pose. Otherwise, it may be considered that this relocation is failed and the failure feedback information will be output, and another location will be recommended to select for relocation.

Figure 6:
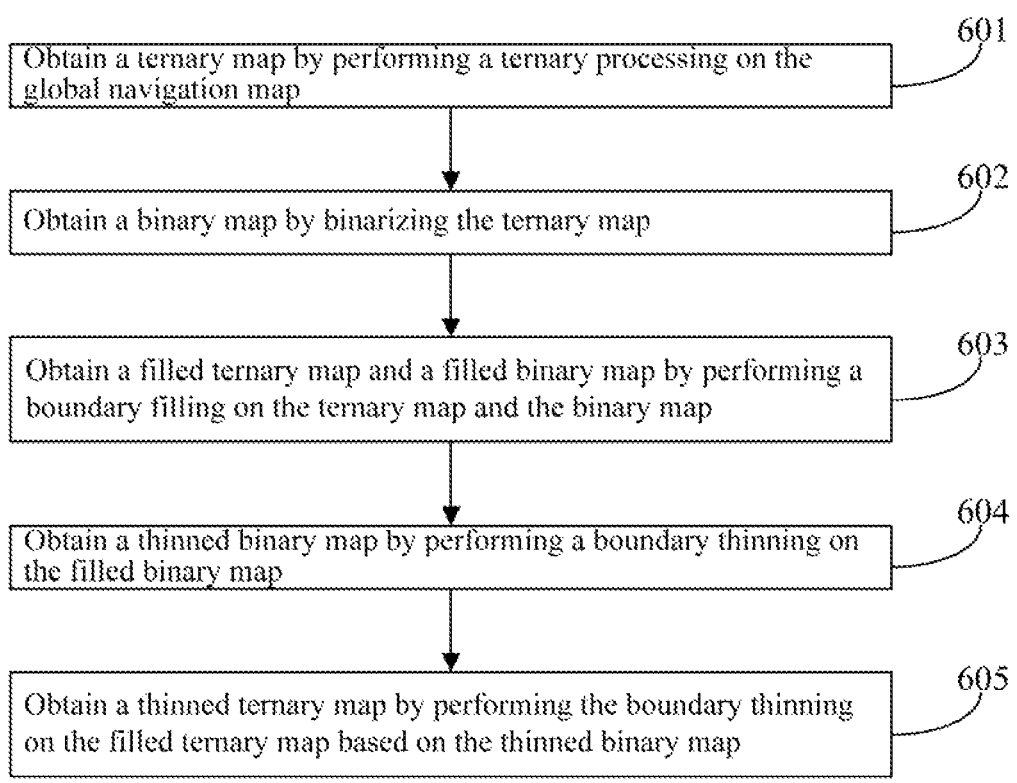
FIG. 6 is a flow chart of preprocessing a global navigation map according to an embodiment of the present disclosure.

The preprocessing of the global navigation map will be described in detail below. FIG. 6 is a flow chart of preprocessing a global navigation map according to an embodiment of the present disclosure. As shown in FIG. 6, the preprocessing the global navigation map may include the following steps.

S601: obtaining a ternary map by performing a ternary processing on the global navigation map.

The range of the pixel value of each pixel in the global navigation map is generally [0, 255]. To facilitate processing, the ternary processing may be performed on the global navigation map, and the pixel value of each pixel is only set to one of three values of 0, 205 and 255 which represents black, gray and white, respectively, so to obtain the ternary map. As an example, the ternary processing may be performed on the global navigation map using an equation of:

$$I_1(x, y) = \begin{cases} 0 & 0 \le I_0(x, y) < minPixel \\ 205 & minPixel \le I_0(x, y) < maxPixel \\ 255 & maxPixel \le I_0(x, y) \le 255 \end{cases};$$

where, $I_0(x, y)$ and $I_1(x, y)$ are the pixel values of any pixel in the global navigation map and the ternary map, respectively, and minPixel and maxPixel are both preset pixel thresholds while their value may be set according to the actual condition. In this embodiment, according to engineering practice, it may set minPixel to 50 and set maxPixel to 240. In the case that the pixel value of a certain pixel in the global navigation map is less than minPixel, the pixel value of a pixel in the ternary map that is at the same position as the above-mentioned pixel will be 0; in the case that the pixel value of a certain pixel in the global navigation map is larger than or equal to minPixel and less than maxPixel, the pixel value of a pixel in the ternary map that is at the same position as the above-mentioned pixel will be 205; and in the case that the pixel value of a certain pixel in the global navigation map is larger than or equal to maxPixel, the pixel value of a pixel in the ternary map that is at the same position as the above-mentioned pixel will be 255.

S602: obtaining a binary map by binarizing the ternary map.

The binarization is performed on the ternary map, that is, the pixel value of each pixel is only set to one of two values of 0 and 25 which represents black and white, respectively, so as to obtain the binary map. In one embodiment, the ternary map needs to be traversed pixel by pixel during the binarization. If its pixel value is 205 or 255, that is, gray or white, the pixel value of the corresponding position of the binary map is set to 255, that is, white. If its pixel value is 0, that is, black, it needs to determine whether there is an effective structure connected by black pixels or by gray, black and white within a 3×3 grid with its position as the center. If yes, it means that the pixel belongs to a valid boundary of an object or wall, and the pixel value of the corresponding position of the binary map needs need to keep as 0 (i.e., black); otherwise, the pixel is likely to be an isolated sensor noise and needs to be filtered out, so the pixel value of the corresponding position of the binary map is set to 255 (i.e., white).

S603: obtaining a filled ternary map and a filled binary map by performing a boundary filling on the ternary map and the binary map.

First, the black boundaries of the binary map are extracted. In this embodiment, all the black boundaries in the binary map may be extracted and saved using the region growing algorithm. The region growing algorithm may be implemented based on breadth-first traversal or depth-first traversal.

Then, each black pixel in the black boundary of the binary map is used as the center to perform the boundary filling on the ternary map and the binary map to obtain the filled ternary map and the filled binary map.

Taking any black pixel in the black boundary of the binary map as an example, the boundary filling may include the following steps.

a: finding a white pixel in eight neighborhoods (i.e., the neighboring pixel on the up, the down, the left, the right, the upper left, the lower left, the upper right, and the lower right) of the ternary target pixel.

The ternary target pixel is a pixel in the ternary map that is at the same position as the binary target pixel, and the binary target pixel is any pixel in the black boundary of the binary map.

If a white pixel is found, step b will be executed; otherwise, no processing is required.

b: recording each pixel scanned on a ghost detection line in a sequential manner until a gray pixel point is scanned.

The ghost detection line is a ray directed from the found white pixel to the ternary target pixel. In this embodiment, a threshold for the maximum number of connected pixels that can be scanned in the direction of the ghost detection line can be set in advance. The threshold is denoted as maxDetectedPixel, and its value may be set according to the actual condition. In the embodiment, it may be set to 5. Generally, in engineering practice, one pixel in a grid map represents 5 cm. If this threshold is set to 5, since the effective ghost detection line that can be filled must be ended by two connected black and gray pixels, the ghost area with the width of up to 3 consecutive white pixel may be filled, that is, the ghosts with a distance of no more than 15 cm may be processed.

If the amount of the recorded pixels is less than the preset threshold (i.e., maxDetectedPixel) and the last recorded pixel is a black pixel, step c is executed; otherwise, no processing is required.

c: filling to-be-filled pixels in the binary map and the ternary map.

As an example, the white pixels in the recorded pixels may be determined as the to-be-filled pixels in the ternary map, and the pixel in the binary map that is at the same position as the to-be-filled pixel in the ternary map is determined as the to-be-filled pixel in the binary map, and finally the to-be-filled pixels in the binary map and the to-be-filled pixels in the ternary map are all set as black pixels.

Each black pixel in the black boundary of the binary map is traversed by executing the process from step a to step C so as to perform the boundary filling on the ternary map and the binary map, and eventually the obtained ternary map after the boundary filling is the filled ternary map while the obtained binary map after the boundary filling is the filled binary map. At this time, the boundary ghost problem has been transformed into a boundary fitting problem.

S604: obtaining a thinned binary map by performing a boundary thinning on the filled binary map.

In order to solve the boundary fitting problem, the map needs to be thinned here, that is, all the thick boundaries in the map that gathers multiple pixels are thinned into one pixel width. In this embodiment, the thinned binary map may be obtained by performing the boundary thinning on the filled binary map using a binary image edge thinning algorithm. The binary image edge thinning algorithm may include, but is not limited to, Hilditch, Pavlidis, Rosenfeld, and index table thinning algorithms.

S605: obtaining a thinned ternary map by performing the boundary thinning on the filled ternary map based on the thinned binary map.

In the thinned binary map obtained through boundary thinning, many redundant black pixels are removed, and the actual boundary of the wall or object is changed. Therefore, it needs to perform merge operation to update to the filled ternary map synchronously. As an example, the pixels in the filled ternary map that are at the same positions as the black pixels in the binary thinned map may be set as black pixels, then the to-be-thinned pixels in filled ternary map are determined, where the to-be-thinned pixels are black pixels at the same position as the white pixels in the binary thinned map. If the amount of the white pixels in the eight neighborhoods of the to-be-thinned pixel is larger than the amount of the gray pixels, the to-be-thinned pixel are set as white pixels; and if the amount of the white pixels in the eight neighborhoods of the to-be-thinned pixel is not larger than the amount of the gray pixels, the to-be-thinned pixels are set as gray pixels. After the above-mentioned processing, the thinned ternary map may be obtained.

In one embodiment, the thinned ternary map may be directly used as the final result. However, considering that the thinned ternary map has solved the problems of the boundary fitting and the boundary ghosting while the problem that the black boundary extends to the gray area and some black object boundaries remained outside the black wall boundary may be aggravated, in other embodiments, after the thinned ternary map is obtained, the black boundary of the thinned binary map may be extracted (which is similar to the boundary extraction in S603, and will not be repeated herein), and the thinned ternary map and the binary thinned map may be respectively optimized using each black pixel in the black boundaries of the thinned binary map as the center so as to obtain an optimized ternary map and an optimized binary map, respectively.

Taking any black pixel in the black boundary of the thinned binary map as an example, the optimization may include the following steps.

First, counting the amount of the white pixels in the eight neighborhoods of the thinned ternary target pixel.

In which, the thinned ternary target pixel is a pixel in the thinned ternary map that is at the same position as the thinned binary target pixel, and the thinned binary target pixel is any pixel in the black boundary of the thinned binary map.

Second, if the counted amount of the white pixels is 0, it means that the black boundary is not adjacent to the passable white area, that is, the black boundary extends to the gray area which does not conform to the white-black-gray projection scanning law of laser and needs to be filtered out. For example, the filtering may be: setting the thinned ternary target pixel as a gray pixel and setting the thinned binary target pixel as a white pixel.

Third, if the counted amount of the white pixels is larger than 0, it can determine whether each scan line is blocked by the black pixel within a preset distance or not. The scan line is a ray directing from the gray pixel in the eight neighborhoods of the thinned ternary target pixel to the thinned ternary target pixel. It is easy to understand that, the amount of the scan lines is the same as the amount of the gray pixels in the eight neighborhoods, that is, the ray of any gray pixel in the eight neighborhoods that directs to the thinned ternary target pixel is a scan line. The preset distance is denoted as maxScannedPixel, and its value may be set according to the actual condition. The value is set based on the ratio of the actual diameter of the robot to the actual distance can be represented by a single pixel in the grid map. If the actual diameter of the robot is 50 cm, and one pixel of the grid map represents a distance of 5 cm, maxScannedPixel may be set to 10, that is, up to scan and store 10 pixels for determining whether it is blocked by the black wall boundary. If all the scanning attempts in the direction of gray-black straight line of the thinned ternary target pixel are blocked by the black boundary, it means that the thinned ternary target pixel is likely to come from the remained object boundary outside the black wall boundary. Because the robot cannot be reasonably fitted near its white area, according to the white-black-gray projection law of laser, the boundary is impossible to be generated and needs to be filtered out. The filtering may be: setting the thinned ternary target pixel point and the white pixels on each scan line as gray pixels, and setting the thinned binary target pixels as white pixels. If there is at least one scan line not blocked by the black pixels within the preset distance, no processing is required.

Each black pixel in the black boundary of the thinned binary map is traversed, the thinned ternary map and the thinned binary map are optimized by performing the above-mentioned optimization respectively, and eventually the obtained optimized ternary map is the optimized ternary map and the obtained optimized binary map is the optimized binary map.

In this embodiment, when the robot needs to relocate, by obtaining a global navigation map and a current scan map of a target scene the mobile machine is located, and generating a local matching sub-map based on the global navigation map; obtaining a black boundary in the local matching sub-map, determining a length and a curve complexity of the black boundary, and determining a matching weight of the black boundary based on the length and the curve complexity of the black boundary; determining an estimated relocated pose and a target black boundary based on the local matching sub-map and the current scan image, and obtaining a matching value between the current scan image and the local matching sub-map based on a matching weight of the target black boundary, where the target black boundary is the black boundary of the matching local matching sub-map matching the current scan map; and determining the estimated pose as a relocated pose of the mobile machine in response to the matching value being larger than a preset matching threshold, it sets the matching weight of the black boundaries according to the length and curve complexity of the black boundaries to increase the effect of small objects and thin areas to the matching, thereby effectively solving the problem of the high false alarm rate of successful relocation, improving the robustness of relocation, and improving the user experience.

Figure 7:
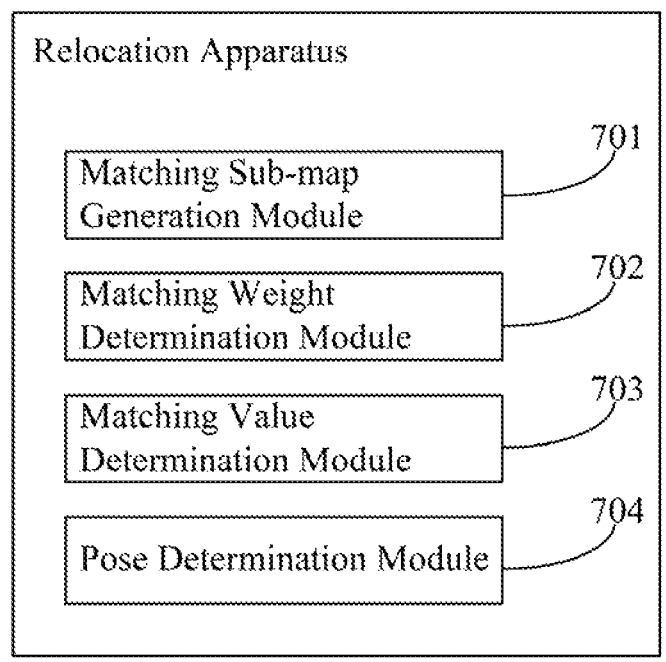
FIG. 7 is a schematic block diagram of a relocation apparatus according to an embodiment of the present disclosure.

FIG. 7 is a schematic block diagram of a relocation apparatus according to an embodiment of the present disclosure. A relocation apparatus corresponding to the relocation method described in the above-mentioned embodiment is provided. In this embodiment, for or ease of description, only the related parts are shown. As shown in FIG. 7, the relocation apparatus may include.

a matching sub-map generation module 701 configured to obtain a global navigation map and a current scan map of a target scene the mobile machine is located, and generate a local matching sub-map based on the global navigation map;

a matching weight determination module 702 configured to obtain a black boundary in the local matching sub-map, determine a length and a curve complexity of the black boundary, and determine a matching weight of the black boundary based on the length and the curve complexity of the black boundary;

a matching value determination module 703 configured to determine an estimated relocated pose and a target black boundary based on the local matching sub-map and the current scan image, and obtain a matching value between the current scan image and the local matching sub-map based on a matching weight of the target black boundary, where the target black boundary is the black boundary of the matching local matching sub-map matching the current scan map; and a pose determination module 704 configured to determine the estimated pose as a relocated pose of the mobile machine in response to the matching value being larger than a preset matching threshold.

In one embodiment, the matching weight determination module 702 may include:

a boundary length determining unit configured to obtain an amount of black pixels contained in the black boundary, and taking the amount of black pixels as the length of the black boundary.

In one embodiment, the matching weight determination module 702 may include:

a first complexity determining unit configured to set the curve complexity of the black boundary to a preset value in response to the length of the black boundary being less than a preset reference length;

a first circle drawing unit configured to draw a first circle with an endpoint of the black boundary as a center and the reference length as a radius in response to the length of the black boundary being larger than or equal to the preset reference length, and obtaining an intersection point of the first circle and the black boundary;

a pixel distance determining unit configured to determine a target black pixel point between the center of the first circle and the intersection point of the first circle and the black boundary in the black boundary, and determine a distance between the target black pixel point and a target straight line, where the target straight line is determined based on the center of the first circle and the intersection point of the first circle and the black boundary;

a complexity increasing unit configured to increase the curve complexity of the black boundary by one counting unit in response to there being a distance larger than a preset distance threshold;

a second circle drawing unit configured to draw a second circle with the intersection point of the first circle and the black boundary as a center and the reference length as a radius; and a second complexity determining unit configured to obtain the curve complexity of the black boundary by returning to the determining the target black pixel point between the center of the first circle and the intersection point of the first circle and the black boundary in the black boundary, and determining the distance between the target black pixel point and the target straight line in response to there being a new intersection point between the second circle and the black boundary until there is no new intersection point between the second circle and the black boundary.

In one embodiment, the matching weight determination module 702 may further include:

a matching weight determining unit configured to calculate the matching weight of the black boundary through an equation of:

$$W_i = e^{D_i(r)} / \ln(L_i); \qquad 1.$$

where, $W_i$ is the matching weight of the i-th black boundary, $D_i(r)$ is the curve complexity of the i-th black boundary, $L_i$ is the length of the i-th black boundary, and r is the reference length.

In one embodiment, the matching sub-map generation module 701 may include:

a matching area determining unit configured to determine an adaptive matching area;

a preprocessing unit configured to preprocess the global navigation map to obtain an optimized navigation map; and a matching sub-map generating unit configured to generate the local matching sub-map based on the adaptive matching area and the optimized navigation map.

In one embodiment, the matching area determining unit may include:

a locating mode determining subunit configured to obtain a locating mode of relocation;

a first matching area determination subunit configured to obtain a global locating position of the robot and a first position of the robot before a navigation fails in response to the locating mode being global relocation, and generating the adaptive matching area based on the global locating position and the first position; and a second matching area determination subunit configured to obtaining the global locating position of the robot, the first position of the robot before the navigation fails, and a second position specified by a user in response to the locating mode being local relocation, and generating the adaptive matching area based on the global locating position, the first position, and the second position.

In one embodiment, the first matching area determination subunit may include:

a third circle drawing subunit configured to draw a third circle with the global locating position as a center and a first preset length as a radius, and drawing a fourth circle with the first position as a center and the first preset length as a radius;

a first matching area determination sub-unit configured to determine a smallest circumscribed rectangle including the third circle and the fourth circle as the adaptive matching area in response to the third circle and the fourth circle intersect or accommodate with each other; and a second matching area determination sub-unit configured to determine a rectangle area with the global locating position as a center and a second preset length as a side length as the adaptive matching area in response to the third circle being separated from the fourth circle or the fourth circle not existing.

It should be noted that, the information exchange, execution process and the like between the above-mentioned apparatus/unit are based on the same idea as the method embodiment of present disclosure. For specific functions and technical effects, please refer to the method embodiment for details, which will not be repeated herein.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

Figure 8:
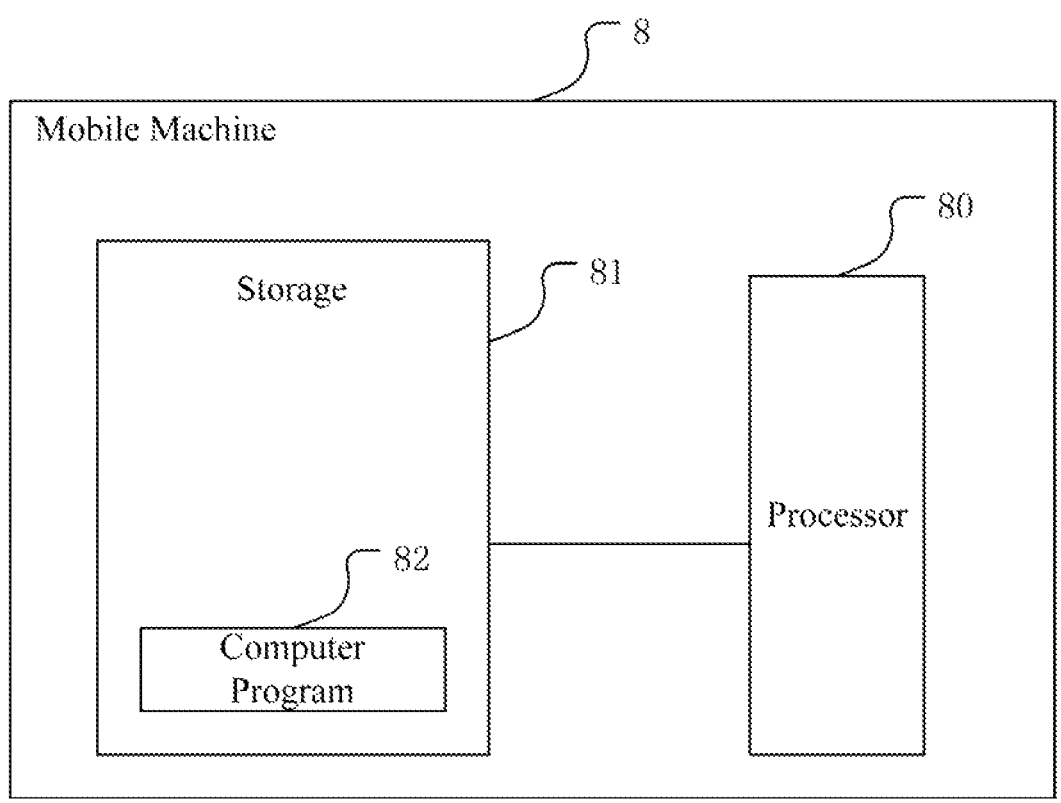
FIG. 8 is a schematic block diagram of a mobile machine according to an embodiment of the present disclosure.

FIG. 8 is a schematic block diagram of a mobile machine according to an embodiment of the present disclosure. As shown in FIG. 8, in this embodiment, a robot 8 includes: at least one processor 80 (only one is shown in FIG. 8), a storage 81, and a computer program 82 stored in the storage 81 and is executable on the at least one processor 80. When the processor 80 executes the computer program 82, the steps in the relocation method of any of the foregoing embodiments are implemented.

Those skilled in the art should be noted that, the robot 8 in FIG. 8 is only an example, and does not constitute a limitation on the robot 8. It may include more or less components than those shown in the figure, include a combination of some components, or include different components. For example, the robot 8 may also include an input and output device, a network access device, and the like.

The processor 8 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

In some embodiments, the storage 81 may be an internal storage unit of the robot 8, for example, a hard disk or a memory of the robot 8. In other embodiments, the storage 81 may also be an external storage device of the robot 8, for example, a plug-in hard disk, a smart media card (SMC), a secure digital (SD) card, flash card, and the like, which is equipped on the robot 8. Furthermore, the storage 81 may further include both an internal storage unit and an external storage device, of the robot 8. The storage 81 is configured to store an operating system, application programs, a boot loader, data, other programs such as the program code of the above-mentioned computer program, and the like. The storage 81 may also be used to temporarily store data that has been or will be output.

The present disclosure further provides a non-transitory computer readable storage medium storing with computer program(s), and when the computer program is executed by a processor, the steps in the above-mentioned method embodiment can be implemented.

The present disclosure further provides a computer program product. When the computer program product is executed on the robot 8, the robot 8 may implement the steps in the above-mentioned method embodiment.

When the integrated unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may at least include any primitive or device capable of carrying the computer program codes to the apparatus/robot, a recording medium, a computer memory, a read-only memory (ROM), a random access memory (RAM), electric carrier signals, telecommunication signals and software distribution media. For example, a USB flash drive, a portable hard disk, a magnetic disk, an optical disk, and the like. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented relocation method for a mobile machine, comprising:
   obtaining a global navigation map and a current scan map of a target scene the mobile machine is located, and generating a local matching sub-map based on the global navigation map;
   obtaining a black boundary in the local matching sub-map, determining a length and a curve complexity of the black boundary, and determining a matching weight of the black boundary based on the length and the curve complexity of the black boundary;
   determining an estimated pose and a target black boundary based on the local matching sub-map and the current scan image, and obtaining a matching value between the current scan image and the local matching sub-map based on a matching weight of the target black boundary, wherein the target black boundary is the black boundary of the matching local matching sub-map matching the current scan map; and
   determining the estimated pose as a relocated pose of the mobile machine in response to the matching value being larger than a preset matching threshold.

2. The method of claim 1, wherein the determining the length of the black boundary comprises:
   obtaining an amount of black pixels contained in the black boundary, and taking the amount of black pixels as the length of the black boundary.

3. The method of claim 1, wherein the determining the curve complexity of the black boundary comprises:
   setting the curve complexity of the black boundary to a preset value in response to the length of the black boundary being less than a preset reference length;
   drawing a first circle with an endpoint of the black boundary as a center and the reference length as a radius in response to the length of the black boundary being larger than or equal to the preset reference length, and obtaining an intersection point of the first circle and the black boundary;
   determining a target black pixel point between the center of the first circle and the intersection point of the first circle and the black boundary in the black boundary, and determining a distance between the target black pixel point and a target straight line, wherein the target straight line is determined based on the center of the first circle and the intersection point of the first circle and the black boundary;

increasing the curve complexity of the black boundary by one counting unit in response to there being a distance larger than a preset distance threshold;

drawing a second circle with the intersection point of the first circle and the black boundary as a center and the reference length as a radius; and obtaining the curve complexity of the black boundary by returning to the determining the target black pixel point between the center of the first circle and the intersection point of the first circle and the black boundary in the black boundary, and determining the distance between the target black pixel point and the target straight line in response to there being a new intersection point between the second circle and the black boundary until there is no new intersection point between the second circle and the black boundary.

4. The method of claim 1, wherein the determining the matching weight of the black boundary based on the length and the curve complexity of the black boundary comprises:

calculating the matching weight of the black boundary through an equation of:

$$W_i = e^{D_i(r)} / \ln(L_i);$$

where, $W_i$ is the matching weight of the i-th black boundary, $D_i(r)$ is the curve complexity of the i-th black boundary, $L_i$ is the length of the i-th black boundary, and r is the reference length.

5. The method of claim 1, wherein the generating the local matching sub-map based on the global navigation map comprises:

determining an adaptive matching area;

preprocessing the global navigation map to obtain an optimized navigation map; and generating the local matching sub-map based on the adaptive matching area and the optimized navigation map.

6. The method of claim 5, wherein the determining the adaptive matching area comprises:

obtaining a locating mode of relocation;

obtaining a global locating position of the robot and a first position of the robot before a navigation fails in response to the locating mode being global relocation, and generating the adaptive matching area based on the global locating position and the first position; and obtaining the global locating position of the robot, the first position of the robot before the navigation fails, and a second position specified by a user in response to the locating mode being local relocation, and generating the adaptive matching area based on the global locating position, the first position, and the second position.

7. The method of claim 6, wherein the generating the adaptive matching area based on the global locating position and the first position comprises:

drawing a third circle with the global locating position as a center and a first preset length as a radius, and drawing a fourth circle with the first position as a center and the first preset length as a radius;

determining a smallest circumscribed rectangle including the third circle and the fourth circle as the adaptive matching area in response to the third circle and the fourth circle intersect or accommodate with each other; and determining a rectangle area with the global locating position as a center and a second preset length as a side length as the adaptive matching area in response to the third circle being separated from the fourth circle or the fourth circle not existing.

8. A mobile machine, comprising:

a processor;

a non-transitory computer readable storage medium coupled to the processor; and one or more computer programs stored on the non-transitory computer readable storage medium and executable on the processor;

wherein, the one or more computer programs comprise:

instructions for obtaining a global navigation map and a current scan map of a target scene the mobile machine is located, and generating a local matching sub-map based on the global navigation map;

instructions for obtaining a black boundary in the local matching sub-map, determining a length and a curve complexity of the black boundary, and determining a matching weight of the black boundary based on the length and the curve complexity of the black boundary;

instructions for determining an estimated pose and a target black boundary based on the local matching sub-map and the current scan image, and obtaining a matching value between the current scan image and the local matching sub-map based on a matching weight of the target black boundary, wherein the target black boundary is the black boundary of the matching local matching sub-map matching the current scan map; and instructions for determining the estimated pose as a relocated pose of the mobile machine in response to the matching value being larger than a preset matching threshold.

9. The mobile machine of claim 8, wherein the instructions for determining the length of the black boundary comprise:

instructions for obtaining an amount of black pixels contained in the black boundary, and taking the amount of black pixels as the length of the black boundary.

10. The mobile machine of claim 8, wherein the instructions for determining the curve complexity of the black boundary comprise:

instructions for setting the curve complexity of the black boundary to a preset value in response to the length of the black boundary being less than a preset reference length;

instructions for drawing a first circle with an endpoint of the black boundary as a center and the reference length as a radius in response to the length of the black boundary being larger than or equal to the preset reference length, and obtaining an intersection point of the first circle and the black boundary;

instructions for determining a target black pixel point between the center of the first circle and the intersection point of the first circle and the black boundary in the black boundary, and determining a distance between the target black pixel point and a target straight line, wherein the target straight line is determined based on the center of the first circle and the intersection point of the first circle and the black boundary;

instructions for increasing the curve complexity of the black boundary by one counting unit in response to there being a distance larger than a preset distance threshold;

instructions for drawing a second circle with the intersection point of the first circle and the black boundary as a center and the reference length as a radius; and instructions for obtaining the curve complexity of the black boundary by returning to the determining the target black pixel point between the center of the first circle and the intersection point of the first circle and the black boundary in the black boundary, and determining the distance between the target black pixel point and the target straight line in response to there being a new intersection point between the second circle and the black boundary until there is no new intersection point between the second circle and the black boundary.

11. The mobile machine of claim 8, wherein the instructions for determining the matching weight of the black boundary based on the length and the curve complexity of the black boundary comprise:

instructions for calculating the matching weight of the black boundary through an equation of:

$$W_i = e^{D_i(r)} / \ln(L_i);$$

where, $W_i$ is the matching weight of the i-th black boundary, $D_i(r)$ is the curve complexity of the i-th black boundary, $L_i$ is the length of the i-th black boundary, and r is the reference length.

12. The mobile machine of claim 8, wherein the instructions for generating the local matching sub-map based on the global navigation map comprise:

instructions for determining an adaptive matching area;

instructions for preprocessing the global navigation map to obtain an optimized navigation map; and instructions for generating the local matching sub-map based on the adaptive matching area and the optimized navigation map.

13. The mobile machine of claim 12, wherein the instructions for determining the adaptive matching area comprise:

instructions for obtaining a locating mode of relocation;

instructions for obtaining a global locating position of the robot and a first position of the robot before a navigation fails in response to the locating mode being global relocation, and generating the adaptive matching area based on the global locating position and the first position; and instructions for obtaining the global locating position of the robot, the first position of the robot before the navigation fails, and a second position specified by a user in response to the locating mode being local relocation, and generating the adaptive matching area based on the global locating position, the first position, and the second position.

14. The mobile machine of claim 13, wherein the instructions for generating the adaptive matching area based on the global locating position and the first position comprise:

instructions for drawing a third circle with the global locating position as a center and a first preset length as a radius, and drawing a fourth circle with the first position as a center and the first preset length as a radius;

instructions for determining a smallest circumscribed rectangle including the third circle and the fourth circle as the adaptive matching area in response to the third circle and the fourth circle intersect or accommodate with each other; and instructions for determining a rectangle area with the global locating position as a center and a second preset length as a side length as the adaptive matching area in response to the third circle being separated from the fourth circle or the fourth circle not existing.

15. A non-transitory computer readable storage medium for storing one or more computer programs, wherein the one or more computer programs comprise:

instructions for obtaining a global navigation map and a current scan map of a target scene a mobile machine is located, and generating a local matching sub-map based on the global navigation map;

instructions for obtaining a black boundary in the local matching sub-map, determining a length and a curve complexity of the black boundary, and determining a matching weight of the black boundary based on the length and the curve complexity of the black boundary;

instructions for determining an estimated pose and a target black boundary based on the local matching sub-map and the current scan image, and obtaining a matching value between the current scan image and the local matching sub-map based on a matching weight of the target black boundary, wherein the target black boundary is the black boundary of the matching local matching sub-map matching the current scan map; and instructions for determining the estimated pose as a relocated pose of the mobile machine in response to the matching value being larger than a preset matching threshold.

16. The storage medium of claim 15, wherein the instructions for determining the length of the black boundary comprise:

instructions for obtaining an amount of black pixels contained in the black boundary, and taking the amount of black pixels as the length of the black boundary.

17. The storage medium of claim 15, wherein the instructions for determining the curve complexity of the black boundary comprise:

instructions for setting the curve complexity of the black boundary to a preset value in response to the length of the black boundary being less than a preset reference length;

instructions for drawing a first circle with an endpoint of the black boundary as a center and the reference length as a radius in response to the length of the black boundary being larger than or equal to the preset reference length, and obtaining an intersection point of the first circle and the black boundary;

instructions for determining a target black pixel point between the center of the first circle and the intersection point of the first circle and the black boundary in the black boundary, and determining a distance between the target black pixel point and a target straight line, wherein the target straight line is determined based on the center of the first circle and the intersection point of the first circle and the black boundary;

instructions for increasing the curve complexity of the black boundary by one counting unit in response to there being a distance larger than a preset distance threshold;

instructions for drawing a second circle with the intersection point of the first circle and the black boundary as a center and the reference length as a radius; and instructions for obtaining the curve complexity of the black boundary by returning to the determining the target black pixel point between the center of the first circle and the intersection point of the first circle and the black boundary in the black boundary, and determining the distance between the target black pixel point and the target straight line in response to there being a new intersection point between the second circle and the black boundary until there is no new intersection point between the second circle and the black boundary.

18. The storage medium of claim 15, wherein the instructions for determining the matching weight of the black boundary based on the length and the curve complexity of the black boundary comprise:

instructions for calculating the matching weight of the black boundary through an equation of:

$$W_i = e^{D_i(r)}/\ln(L_i);$$

where, $W_i$ is the matching weight of the i-th black boundary, $D_i(r)$ is the curve complexity of the i-th black boundary, $L_i$ is the length of the i-th black boundary, and r is the reference length.

19. The storage medium of claim 15, wherein the instructions for generating the local matching sub-map based on the global navigation map comprise:

instructions for determining an adaptive matching area;

instructions for preprocessing the global navigation map to obtain an optimized navigation map; and instructions for generating the local matching sub-map based on the adaptive matching area and the optimized navigation map.

20. The storage medium of claim 19, wherein the instructions for determining the adaptive matching area comprise:

instructions for obtaining a locating mode of relocation;

instructions for obtaining a global locating position of the robot and a first position of the robot before a navigation fails in response to the locating mode being global relocation, and generating the adaptive matching area based on the global locating position and the first position; and instructions for obtaining the global locating position of the robot, the first position of the robot before the navigation fails, and a second position specified by a user in response to the locating mode being local relocation, and generating the adaptive matching area based on the global locating position, the first position, and the second position.

* * * * *